Sept. 24, 1957 W. CLAYTON 2,807,500
SELF PROPELLED IRRIGATION APPARATUS
Filed June 1, 1955 4 Sheets-Sheet 1
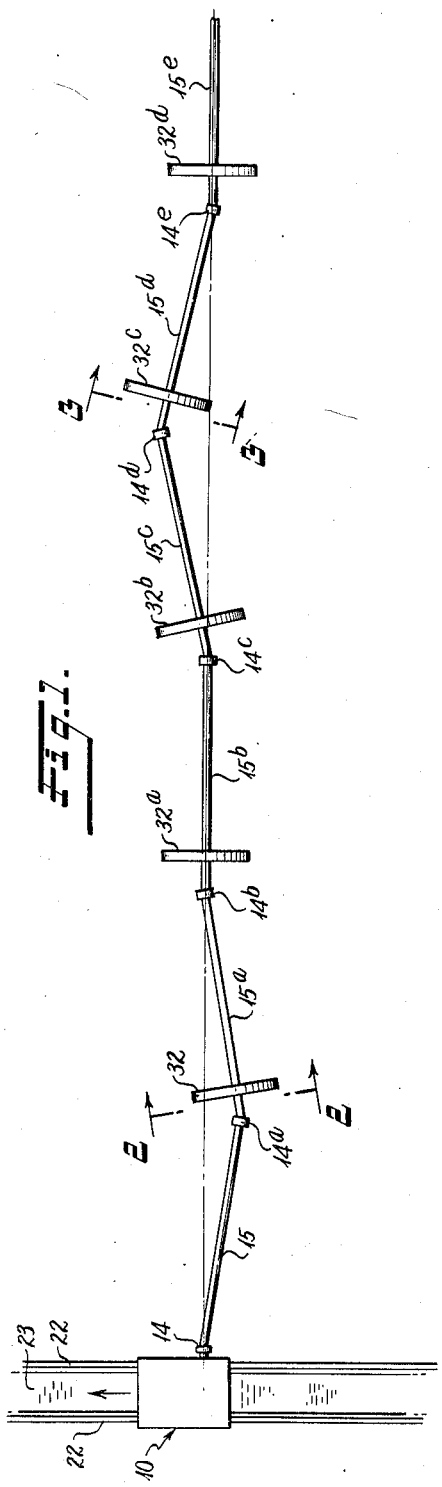
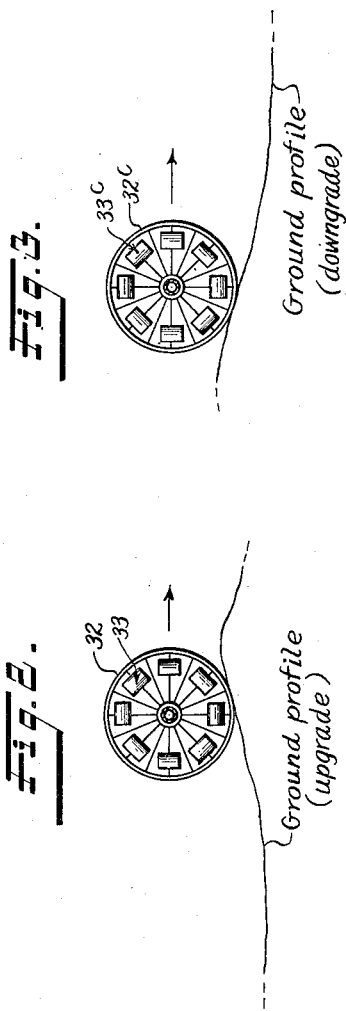
INVENTOR
WILLIAM CLAYTON
BY Bacon & Thomas
ATTORNEYS Sept. 24, 1957 W. CLAYTON 2,807,500
SELF PROPELLED IRRIGATION APPARATUS
Filed June 1, 1955 4 Sheets-Sheet 2
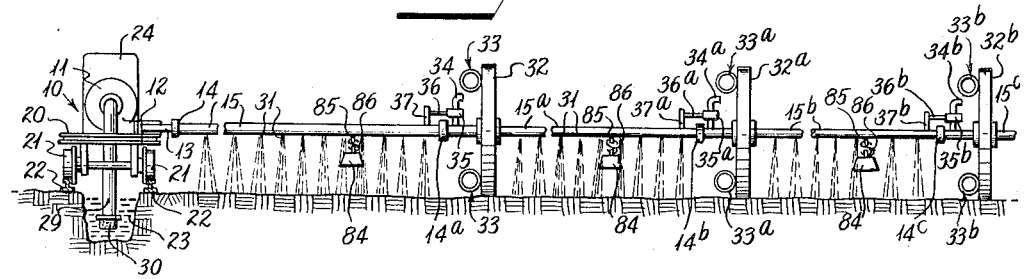
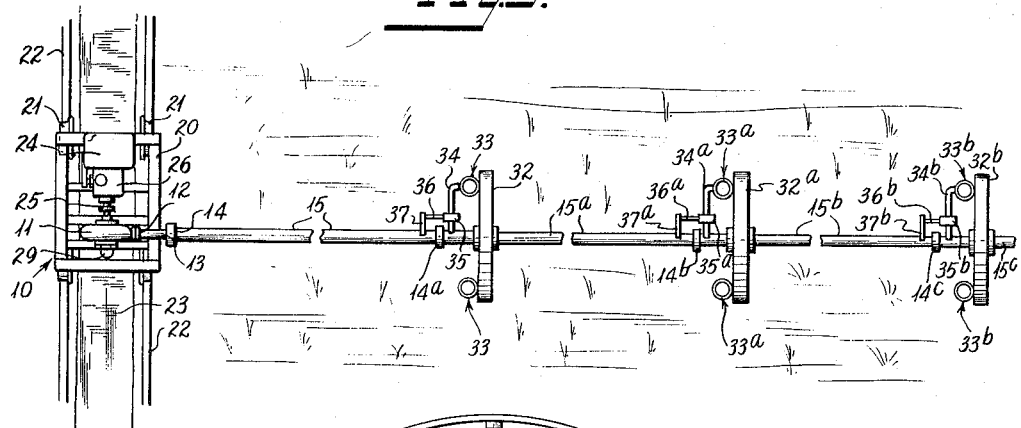
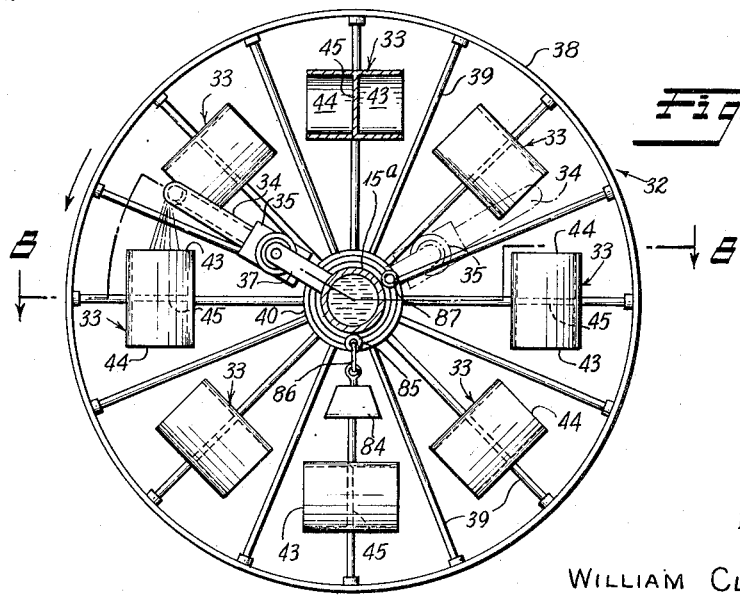
INVENTOR
WILLIAM CLAYTON
BY
ATTORNEYS Sept. 24, 1957 W. CLAYTON 2,807,500
SELF PROPELLED IRRIGATION APPARATUS
Filed June 1, 1955 4 Sheets-Sheet 3
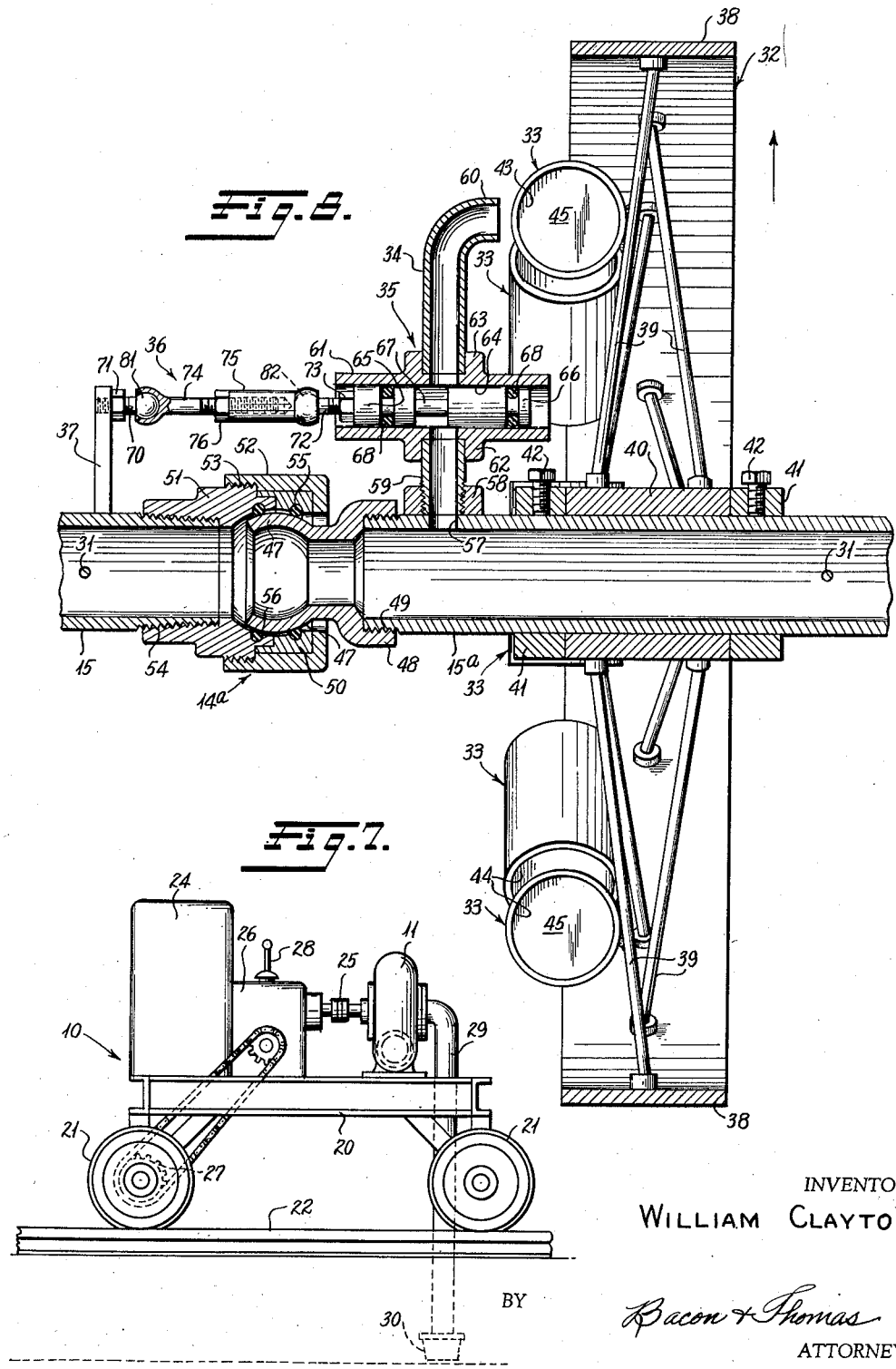
INVENTOR
WILLIAM CLAYTON
BY
Bacon + Thomas
ATTORNEYS Sept. 24, 1957 W. CLAYTON 2,807,500
SELF PROPELLED IRRIGATION APPARATUS
Filed June 1, 1955 4 Sheets-Sheet 4

INVENTOR
WILLIAM CLAYTON
BY
Bacon & Thomas
ATTORNEYS

United States Patent Office 2,807,500
Patented Sept. 24, 1957

2,807,500
SELF PROPELLED IRRIGATION APPARATUS
William Clayton, El Monte, Calif.

Application June 1, 1955, Serial No. 512,377

10 Claims. (Cl. 299—52)

This invention relates to a self-propelled irrigation apparatus for use in irrigating large tracts of land, and more particularly, to irrigation apparatus in which a plurality of sprinkler pipes are connected in end-to-end relation by universal joints or other flexible couplings and supported on wheels whose speed of rotation is automatically and individually controlled so that water from an irrigation ditch or other suitable source may be carried by the pipe assembly and distributed over the surface of the field to be irrigated while the assembly is maintained in a substantially straight line across the field.

Heretofore, it has been the common practice to irrigate large fields by pumping water from a ditch and distributing it through light-weight pipe extending over the ground. After one area of the field has been irrigated, the pipe line is disassembled and moved to another area. The cost of labor and the time delay in this type of operation has made it economically impractical. Moreover, attempts to advance irrigation pipe systems across the terrain without disassembling the sections has presented many difficulties. Where a mobile rigid pipe system is mechanically driven by means at the end or ends of the assembly, undesirable strains are placed on the pipe couplings and the length of the pipe assembly permissible is very limited. Where flexible pipe couplings are employed, a number of driving devices must be employed and difficulty is encountered in correlating the speed of the driving devices to maintain proper alignment of the pipe line assembly. Operating difficulties are multiplied in attempting to operate the previously known systems over uneven terrain. On such terrain, the surface distance that the driving means of one pipe section has to cover may be different from the surface distance to be covered by the driving devices of adjoining pipe sections. This is due to the difference in the number and degree of depressions or elevations in the terrain encountered by the driving devices of the various pipe sections. Moreover, the rates at which the driving devices tend to travel may be different at different points along the pipe line depending upon whether a particular section is progressing on the level, on a downgrade, or on an upgrade. Under such circumstances, the pipe assembly often assumes a zigzag line with some pipe sections leading and others lagging the general line. Accordingly, constant manual attention is required to maintain the system in proper alignment, and the automatic operation desired is defeated.

The principal object of this invention is to provide irrigation apparatus which includes means for advancing a pipe line in a manner solving the aforementioned difficulties.

Another object of the invention is to provide irrigation apparatus comprising an assemblage of pipe sections adapted to advance across and irrigate a field in which means are provided for automatically advancing each pipe section at a controlled rate of speed so that the entire assembly moves in a substantially straight line.

Another object of the invention is to provide irrigation apparatus comprising an assemblage of pipe sections adapted to advance across and irrigate a field in which means are provided for advancing the pipe sections at different speeds when required, to compensate for uneven conditions of terrain crossed and thereby maintain the pipe sections in proper alignment in the pipe assembly.

Another object of the invention is to provide irrigation apparatus comprising an assemblage of pipe sections adapted to advance across and irrigate a field in which fluid-operable means are provided for the driving wheels carrying the pipe sections and in which the fluid for operating such means is a portion of the irrigating water carried by the pipe line.

Another object of the invention is to provide irrigation apparatus comprising an assemblage of pipe sections carried by wheels and adapted to advance across and irrigate a field in which means are provided for controlling the rate of advancement of each pipe section as a function of the angular relation of such pipe section with an adjoining pipe section.

Another object of the invention is to provide irrigation apparatus comprising an assemblage of pipe sections carried by wheels and adapted to advance across and irrigate a field in which fluid-operated means are provided for driving the wheels carrying the pipe sections and the supply of fluid to the fluid operated means is controlled as a function of the angular relation between adjoining pipe sections.

A further object of the invention is to provide irrigation apparatus comprising an assemblage of pipe sections adapted to advance across and irrigate a field in which means are provided for advancing each pipe section at a controlled rate and in which means are further provided for reversing the movement of the pipe assembly so that the assembly may move back across and continue to irrigate the field just irrigated.

These and other objects and advantages of the invention will be made clear by reference to the ensuing description taken in connection with the accompanying drawings, in which:

Figure 1 is a plan view showing diagrammatically an irrigation pipe line assembly in which several pipe sections have become misaligned due to irregularities in the terrain being traversed.

Figure 2 is a vertical section taken on the lines 2—2 of Figure 1 and showing a carrying wheel of the pipe line traveling upgrade with respect to the local ground profile whereby the section of pipe carried by such wheel tends to lag the general pipe line as shown in the plan view of Figure 1.

Figure 3 is a vertical section taken on the lines 3—3 of Figure 1 and showing a carrying wheel of the pipe line traveling downgrade with respect to the local ground profile whereby the section of pipe carried by such wheel tends to lead the general pipe line as shown in the plan view of Figure 1.

Figure 4 is an elevational view showing irrigation apparatus including a portion of a pipe line assembly embodying the principles of this invention whereby the difficulties illustrated in Figure 1 may be avoided.

Figure 5 is a plan view of the irrigation apparatus shown in Figure 4.

Figure 6 is a vertical section taken through one of the pipe sections of the apparatus shown in Figure 4 illustrating in greater detail fluid-operating means for driving a pipe carrying wheel.

Figure 7 is a side elevational view of the carriage device shown in Figure 4 for carrying the end of the pipe line assembly and supplying water thereto from an irrigation ditch.

Figure 8 is a fragmentary sectional view taken on the lines 8—8 of Figure 6 and showing in detail a flexible coupling between adjoining pipe sections, a fluid propelled carrying wheel, and the novel means of the invention for controlling the supply of water from one of the pipe sections to the fluid-propelled wheel, the pipe sections being shown in axial alignment with the fluid-control means in position to permit a normal supply of water to the fluid-propelling means.

Figure 9:
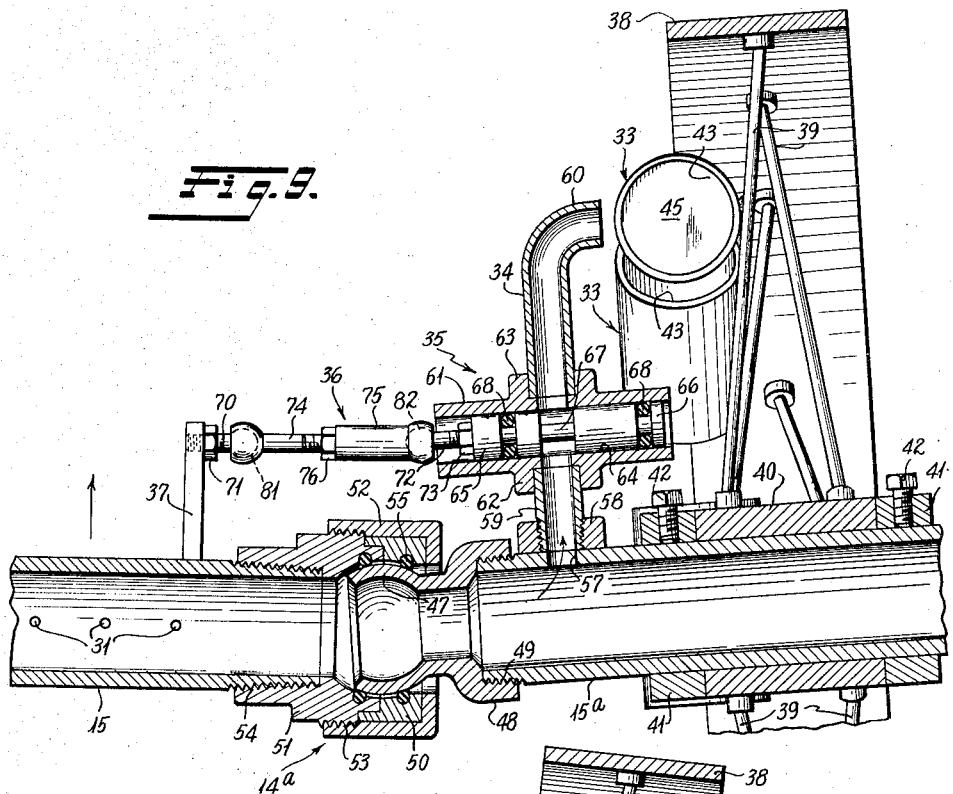

Figure 9 is a view similar to that shown in Figure 8 but showing the adjoining pipe sections and control means in the position they assume when the carrying wheel is lagging the general line as shown at the left of Figure 1, i. e., wherein the angle between the pipe sections has decreased and it has become necessary to drive the carrying wheel more rapidly in order to realign these sections.

Figure 10:
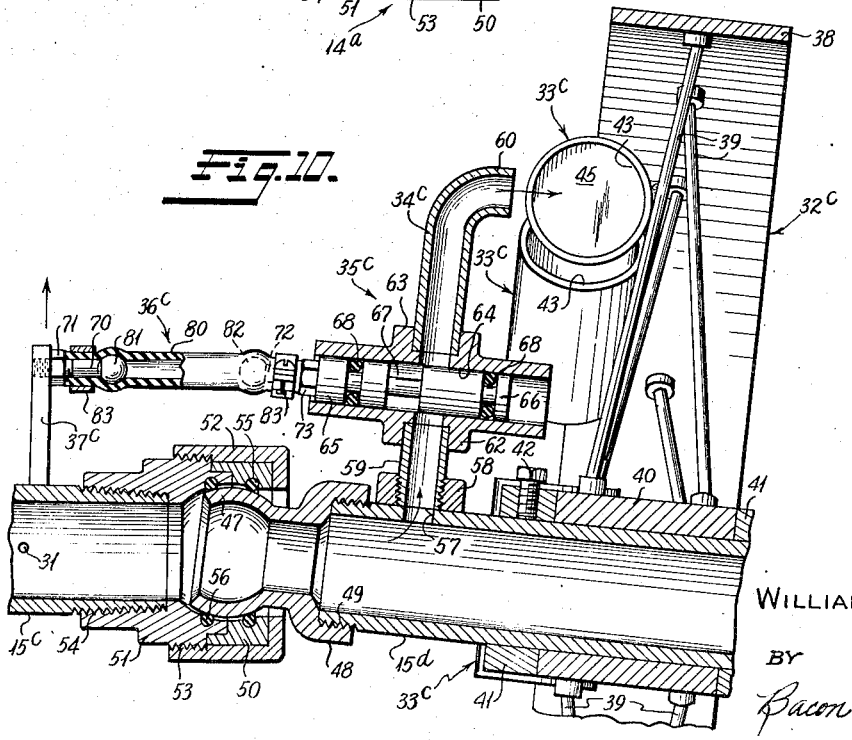

Figure 10 is a view similar to Figure 8 but showing the adjoining pipe sections and control means in the position they assume when the carrying wheel is leading the general line as shown to the right in Figure 1, i. e., wherein the angle between the pipe sections has increased and it has become necessary to drive the carrying wheel less rapidly in order to realign the sections.

Referring to the drawings in detail, and more particularly, to Figures 1, 4 and 5 thereof, the irrigation apparatus of this invention is shown as embodying a carriage generally designated as 10, carrying a pump 11 which is connected by means of a flanged joint 12, short pipe section 13 and flexible coupling 14 to the end pipe of a plurality of pipe sections 15, 15a, 15b, 15c, etc. similarly joined in end to end relation by flexible couplings 14a, 14b, 14c, etc. respectively. It will be understood that a great number of pipe sections may be employed so that the entire pipe assembly is capable of extending over and irrigating a large field. The pipe sections 15, 15a, 15b, 15c, etc. may be of decreasing diameter as the distance from the supply pump increases since the pipes carry less volume of irrigating liquid as this distance increases. This decrease in pipe diameter has been exaggerated in Figures 4 and 5 of the drawings for simplicity of illustration and it will be understood that in actual practice a number of pipe sections may be of substantially the same diameter.

The carriage 10 as best shown in Figures 4, 5 and 7 is provided with a platform or frame 20 supported on wheels 21 which rest on and are adapted to run on tracks 22 straddling an irrigation ditch 23. The carriage 10 carries a motor 24 coupled by a clutch 25 to pump 11 and also coupled through a gear box 26 to sprocket wheel 27 (Figure 7) adapted to drive the carriage 10 along the tracks 22. The gear box 26 is provided with both speed reduction gearing and with reversing mechanism, the latter being operable by means of gear shift lever 28 whereby the carriage 10 may be driven slowly along the tracks in a selected direction. The same motor drives both the pump 11 and the carriage 10.

The pump 11 has an intake connected to a suction pipe 29 (Figure 4) which dips into the water flowing through irrigation ditch 23. The bottom of suction pipe 29 is provided with a strainer 30 to prevent debris from entering the intake and damaging the pump. Irrigation water is pumped from the irrigation ditch 23 as the carriage 10 proceeds slowly down the track and is delivered by the pump 11 through pump outlet 12 and connecting pipe 13 to the sprinkler pipe assembly.

As best shown in Figure 4, each of the pipe sections is provided with a plurality of sprinkler discharge openings 31 for distributing irrigation water evenly along the terrain. In order to carry these pipe sections over the terrain, each pipe section exclusive of that section nearest the carriage 10 is provided with a wheel adjacent the flexible coupling joining it to the next preceding pipe section. These wheels are designated by the reference numerals 32, 32a, 32b, 32c, etc. Since the wheels, flexible couplings, and control elements for each pipe section are all of similar construction only one assembly will be described in detail. Accordingly, each wheel, as for example wheel 32, is provided with a series of buckets 33 radially spaced from the wheel axis and adapted to receive water from a conduit 34 connected to the pipe section carried by the wheel. The conduit 34 is provided with a control valve 35 adapted to be actuated by an arm 36 extending across the flexible coupling 14a and attached by a rod 37 to the adjoining pipe section.

As more clearly shown in Figures 6 and 8–10, the wheels 32 comprise a rim 38 connected by spokes 39 to a hub 40 adapted to rotate on the pipe section as an axle. The wheels are held in axial position on the respective pipe sections by any suitable means, as by means of collars 41 affixed to the pipe section by set screws 42 (Figure 8). It will be understood that suitable bearings may be provided to reduce friction between the wheel and pipe. The wheels 32, 32a, 32b, 32c, etc., are preferably all of the same outside diameter although the hub diameters may be different so as to fit the particular pipe section carried. Alternatively, the wheels may be identical and the portion of the pipe section acting as the axle may be built up as by means of shims or the like to fit the internal hub diameter. The wheel diameter may be selected to suit the particular soil conditions and size of the irrigation system. Wheels of, for example, 36 to 48 inches in diameter have been found satisfactory in one location.

The radially spaced propelling buckets 33 are welded or otherwise affixed to the spokes 39 preferably near the periphery of the wheels 32 to take best advantage of the propelling torque. As shown in Figure 6, the buckets 33 may be eight in number equi-angularly spaced around the wheel. It will be understood that any desired number of propelling buckets may be provided and that other fluid propelling means might also be employed without departing from the basic principles of this invention. In the embodiment illustrated, each of the buckets 33 is divided into two compartments 43 and 44 (Figure 6) by a central partition 45. The wheels 32 may thereby be propelled in clockwise or counterclockwise direction in a manner that will hereinafter be further described.

The flexible couplings 14, 14a, 14b, 14c, etc. between each of the pipe sections and the valve control means controlling the flow of fluid to the buckets 33 of the fluid-operated wheels 32 will now be described in detail. As shown in Figure 8, the flexible couplings, as illustrated by coupling 14a between adjoining pipe sections 15 and 15a, are of the ball and socket type and comprise a hollow ball joint 47 having an internally threaded end portion 48 engaging threads 49 on the end of the pipe 15a. The ball joint 47 is held within a split socket formed by members 50 and 51, by means of a retaining ring 52 which threadedly engages external threads 53 on the member 51. Member 51 is also provided with internal threads 54 whereby it is held in threaded engagement with the end of the pipe section 15. Ring-shaped resilient members 55 and 56 seated within grooves in the split socket members 50 and 51 respectively provide a fluid-tight seal for the joint while permitting free flexible movement of the ball and socket. It will be understood that other types of flexible joints may be provided for coupling the two pipe sections without departing from the principles of this invention.

The right-hand pipe section 15a is provided near the end thereof with a radial opening 57 between the retaining collar 41 for wheel 32 and the flexible coupling 14a joining the pipe sections, whereby water for motivating the wheel 32 may be supplied from the main pipe line. An external boss 58 welded or otherwise secured to the pipe 15 accommodates a short nipple 59 connecting opening 57 through slide valve 35 to conduit 34. The end 60 of conduit 34 is curved in such manner as to direct water from this conduit into the buckets 33 on the wheel 32.

The slide valve 35 comprises a housing 61 having lateral bosses 62 and 63 accommodating nipple 59 and conduit 34 respectively, and an internal valve chamber 64 which accommodates a reciprocatory movable double end piston for controlling fluid flow from nipple 59 to conduit 34. The double end piston comprises spaced piston members 65 and 66 joined by a shaft 67. O-rings 68 seated in grooves in the piston members provide a liquid-tight seal for the ends of the chamber 64. The position of the piston member 66 controls the effective area of the communicating channel between nipple 59 and conduit 34 and thereby controls the flow of liquid from pipe section 15a to the buckets 33 on the wheel 32. In the valve position shown in Figure 8, it is assumed that the pipe sections 15 and 15a are in axial alignment. The rate at which water from the pipe line can be delivered to the propelling buckets 33 through the valve in this position is such that the pipe section is advanced across the terrain at the speed desired.

As aforestated, the control valve 35 is actuated by an arm 36 extending across the flexible coupling between the pipe sections and connected by a rod 37 to the adjoining pipe section. Thus, as shown in Figure 8, the rod 37 is shown as welded or otherwise affixed substantially perpendicular to the left-hand pipe section 15 adjacent the flexible coupling 14a. The arm 36 comprises a double ball and socket member having one end threadedly engaging rod 37 and locked thereto by means of jam nut 71, and the other end 72 threadedly engaging piston member 65 and locked thereto by means of jam nut 73. The arm 36 is made adjustable in length by the provision of an externally threaded member 74 which cooperates with an internally threaded member 75. The member 75 is provided with an end portion 76 of hexagonal cross section whereby it may accommodate a wrench. Adjustment of the arm 36 is made by either turning the member 75 so that it is advanced upon the member 74 whereby the arm 36 is shortened and the slide valve is closed to a greater extent, or is backed off to member 74 whereby the arm 36 is lengthened and the slide valve is opened to a greater extent. By this adjusting means the normal rate of flow of water from the pipe section 15a to the propelling buckets 33 of the wheel 32 may be varied so that the wheel may advance the pipe over the ground at a predetermined rate to provide the extent of irrigation desired.

One of the important advantages of the valve adjusting means resides in the fact that each valve along the pipe line may be individually adjusted to a degree required by the particular location of the valve in the pipe line assembly to thereby supply propelling fluid to the associated wheel at a rate required to maintain this wheel in alignment with the carriage and the other wheels of the assembly across level ground. Accordingly, the valves may be adjusted to different positions to compensate for pressure drop in the line as the distance from the pump increases. Also, the valves may be individually adjusted to compensate for differences in valve position due to changes in pipe diameter from one pipe section to another. Thus, the same type valve can be employed whether the pipe sections coupled together at a given joint are of the same or different sizes.

An important aspect of the invention is the manner in which the valve control means automatically adjusts the rate of flow of water to the propelling buckets 33 to compensate for uneven ground conditions and thereby keep the pipe sections in substantial alignment. In the positions shown in Figure 8, the pipe sections 15 and 15a are in axial alignment and the valve 35 is opened to the desired extent to supply water to the propelling buckets 33 and propel the wheel 32 at the rate necessary to advance the pipe section at the predetermined speed. Now, if uneven ground conditions have permitted the wheel 32 to get behind the general line, as shown in Figure 1, the pipes and parts of the valve assembly assume the positions shown in Figure 9. Thus, the angle between the pipes 15 and 15a is less than 180°. In this position the distance between the rod 37 and the slide valve 35 is less than the distance between these elements when the pipe sections are in axial alignment as shown in Figure 8. Arm 36, therefore, forces piston members 65 and 66 to the right in the valve chamber 64 to more fully open the valve and permit a greater flow of water from the pipe section 15a to the propelling buckets 33. The wheel 32 carrying pipe section 15a therefore speeds up until the angle between the sections 15 and 15a straightens out and the pipe sections are again in substantially axial alignment, at which point the valve 35 will permit the normal flow of water to be supplied to the propelling buckets 33 so as to again advance the pipe sections at the predetermined rate. Accordingly, this wheel covers any added distance it may have to travel by reason, for example, of a hill as shown in Figure 2, in substantially the same length of time as would be required for normal rate of travel over level ground and thus keeps up with the other wheels which may not have encountered the obstacle.

It will be noted from Figure 1 that while the lagging of wheel 32 causes the angle between pipe sections 15 and 15a to decrease whereby the valve means of the invention cause this wheel to be given greater propelling speed, this condition causes the angle over the next flexible joint 14b between pipe sections 15a and 15b to increase whereby the valve means across joint 14b would cause the next wheel 32a to be given a slower propelling speed. The angle across joint 14b determined by the position of wheel 32 would increase, however, to only one-half that at which the angle across 14a decreases. Theoretically the wheel 32a should decrease in speed at about one-half the rate that the wheel 32 is increasing. The combined effect would be to straighten out the line more quickly. In practice, however, the angle at the secondary point would be so small as to have a negligible effect upon the operation of the system, and the misalignment is rapidly corrected by control of flow at the leading or lagging wheel.

In Figure 10 the reverse condition to that illustrated in Figure 9 is shown. Here it is assumed that the wheel is leading the general line because of uneven ground conditions. For example, the wheel 32c as shown in Figure 1 may be leading the line because of a temporary increase in speed due to a downgrade as shown in Figure 3. The angle between the pipes 15c and 15d is greater than 180° and the distance between the rod 37 and the valve 35 is greater than under normal conditions. Arm 36, therefore, pulls piston members 65 and 66 to the left in the valve chamber 64 closing the effective area between the nipple 59 and conduit 34 to a greater than normal extent thereby permitting a smaller flow of water into the propelling buckets 33c of the wheel 32c. Wheel 32c accordingly slows up until substantially axial alignment has been established between the pipe sections. It will be understood that the wheels carrying each of the pipe sections compensate in similar manner for any misalignment so that the whole pipe line is automatically maintained in axial alignment.

In Figure 10 a modified form of flexible connecting linkage has been illustrated for the arm 36c. In this modification a length of flexible tubing 80 has been substituted for the adjustable members 74 and 75 shown in Figures 8 and 9. The ends of the tubing 80 are forced over ball elements 81 and 82 of the end members 70 and 72 respectively, and are held in place thereon by means of clamps 83. Adjustment can be made with this type of coupling by forcing the ends of the flexible tubing 80 to a greater or lesser extent past the ball elements 81 and 82 and then clamping the ends in the adjusted position.

It will be noted that the wheels 32, 32a, 32b, etc. rotate about the respective pipe sections whereas the pipe sections are designed to maintain a stationary angular position. As best shown in Figures 4 and 6, the pipe sections are maintained in a position such that conduits 34 are in the best angular position to supply water to the propelling buckets 33. In order to maintain the pipe sections in this angular position, counterbalancing weights 84 are provided. These weights are suspended from the bottom of the pipe by any suitable means such as by eye-rings 85 and links 86 (Fig. 6). In the position shown in Figure 6 the wheel 32 is designed to rotate counterclockwise and to advance a pipe section 15a to the left. Conduit 34 supplies water to the bucket compartment 43. Should it be desired to run the pipe line back over the field in the reverse direction, the carriage 10 and pump 11 are stopped and the weights 84 are removed from the pipe sections and shifted to an eye-ring 87 at a different position on the pipe periphery. The pipe sections 15 are now given a partial revolution until the weight 84 is again at the bottom of the pipe and the conduits 34 have assumed a position shown in the dotted lines in Figure 6 whereby they will empty into the compartments 44 of the propelling buckets 33. Upon reversing the direction of the carriage 10 and again starting the pump 11, the pipe line will run back over the field, automatically remaining in substantial alignment as before. Weights 84 maintain the pipe sections 15, 15a, 15b, etc. and conduits 34, 34a, 34b, etc. in the new angular position for reverse operation.

In starting the irrigating operation, the motor 24 is started and the pump 11 is placed in operation to fill the pipe line. The carriage 10 is now started in the desired direction and the speed of the carriage 10 may be such that it advances down the track 22 at a rate of, for example, about one foot per minute. The valves 35, 35a, 35b, etc. supplying water to the buckets 33, 33a, 33b, etc. propelling the wheels 32, 32a, 32b, etc. respectively have been adjusted so that the wheels normally carry the pipe sections forward at the same rate of speed as the carriage 10. It will be understood, however, that the valves 35, 35a, 35b, etc. will supply a varying amount of water as the pipe line advances, depending upon the conditions of terrain encountered by the particular wheels so that some of the wheels may actually travel faster at certain times than the carriage and the adjoining wheels in order to reach the final destination at the same time and maintain proper pipe alignment. For example, the pipe propelling means may be capable of moving the wheels at a rate in the range of from 0 to 12 feet per minute by proper selection of valves and valve adjustment.

While the foregoing description illustrates a preferred embodiment of the invention, it will be understood that various modifications of the irrigating apparatus may be made without departing from the broad principles and scope of the invention. For example, the wheels carrying the pipe sections may be provided with other types of propelling means, the speed of which is controlled as a function of the angular relationship between the pipe sections. The position of the wheels with respect to the flexible joints may be reversed so that the wheels are to the left of the joint and all pipe sections, including the first, are provided with a propelling wheel. The propelled wheels may be interspersed with non-propelled carrying wheels. The pipe assembly may be connected to a source of irrigation water in many different ways.

Accordingly, it will be understood that various changes in the details of the invention may be made without departing from the principles thereof or the scope of the annexed claims.

I claim:

1. In a portable irrigation system having a plurality of sprinkler pipe sections connected by flexible couplings, the combination with each of a number of adjoining pipe sections, comprising: a fluid-operated wheel carrying said pipe section, said pipe section constituting an axle for said wheel, conduit means connected to said pipe section for supplying propelling fluid to said wheel, a control valve in said conduit, means connecting said control valve to the next adjoining pipe section so that said control valve is responsive to the angular relation of said adjoining pipe section to control the flow of fluid to said wheel, whereby the speed of said wheel is determined by the position of said wheel with respect to the position of other wheels in the pipe line assembly.

2. In a portable irrigation system having a plurality of sprinkler pipe sections connected by flexible couplings, the combination with each of a number of adjoining pipe sections, comprising: a fluid-operated wheel carrying said pipe section, said pipe section constituting an axle for said wheel, conduit means connected to said pipe section for supplying propelling fluid to said wheel, a valve in said conduit having a control element for controlling the flow of fluid, a flexible arm connecting said valve control element across said flexible pipe coupling to the adjoining pipe section so that the angular relation between said pipe sections controls the fluid flow through said valve, whereby the speed of said wheel is determined by the position of said wheel with respect to the position of other wheels in the pipe line assembly.

3. The apparatus of claim 2 wherein the length of said flexible arm is adjustable whereby the valve may be opened to a selected position.

4. In an irrigation system including a plurality of sprinkler pipe sections joined in end to end relation by flexible couplings, the combination with each of said pipe sections, comprising: a wheel rotatably mounted on said pipe section adjacent one of said flexible couplings and including fluid propelling means, said pipe section constituting an axle for said wheel, a conduit connected to said pipe section for delivering propelling fluid to said fluid-propelling means, a slide valve in said conduit, and an arm connecting an adjoining pipe section and said valve, said arm being responsive to the angular relation between said pipe section and said adjoining pipe section to control the position of said slide valve so as to control the rate at which propelling fluid is supplied to said propelling means and thereby control the speed of said wheel.

5. A self-propelled irrigation system adapted to automatically move across and irrigate a field, comprising: a carriage adapted to follow an irrigation channel adjacent said field, a pump carried by said carriage and adapted to draw water from said irrigation channel, means for driving said pump and carriage, a plurality of sprinkler pipe sections connected in end to end relation by flexible couplings, a flexible coupling connecting an end section of said pipe line to said pump, a fluid-operated wheel for carrying and advancing a pipe section over an area to be irrigated at substantially the same speed as said carriage, said pipe section constituting an axle for said wheel, conduit means connected to said pipe section for delivering propelling fluid to said fluid-operated wheel, a valve in said conduit, and an arm connecting said valve to an adjacent pipe section to control the supply of fluid to said fluid-operated wheel as a function of the angular relation between adjoining pipe sections, whereby said pipe sections may be maintained in substantially axial alignment.

6. The apparatus of claim 5 wherein the means for driving the pump and carriage include means for reversing the direction of the carriage, and wherein means are provided for reversing the direction of travel of the fluid-operated wheel carrying and advancing said pipe section, whereby said carriage and pipe line assembly may be moved in either direction over a field to be irrigated.

7. A self-propelled irrigation system adapted to automatically move across and irrigate a field, comprising: a carriage adapted to follow an irrigation channel adjacent said field, a pump carried by said carriage and adapted to draw water from said irrigation channel, means for driving said carriage and pump, a plurality of sections of sprinkler pipe connected in end to end relation by flexible couplings to form an irrigation line, a flexible coupling connecting an end section of said pipe line to said pump; each of the remaining pipe sections including a rotatably mounted fluid-propelled wheel concentric therewith and adjacent a flexible coupling member connecting said pipe section to an adjoining pipe section, a conduit connected to said pipe section for supplying propelling fluid to said wheel, a control valve in said conduit for controlling the flow of operating fluid to said wheel, said control valve being normally partially open to a selected position, a flexible arm connecting said control valve to said adjoining pipe section across said flexible coupling, said flexible arm being responsive to the angular relation of the adjoining pipe sections to move said valve to a more fully open position upon decrease of the angle between pipe sections and to move said valve toward a more nearly closed position upon increase of said angle between said pipe sections, whereby the speed of said wheel is controlled so that said pipe sections are maintained in substantial alignment during the advancement of said system over the field.

8. The apparatus of claim 6, wherein the fluid-operated wheel includes a plurality of buckets spaced radially from the axis of rotation of the wheel and having opposed open-end compartments, and wherein means are provided for delivery of operating fluid from said conduit into a selected compartment of said buckets to thereby control the direction of travel of said wheel.

9. In a portable irrigation system having a self-propelled sprinkler pipeline, a pair of pipe sections joined by a flexible coupling, a wheel adjacent said flexible coupling and carrying one of said pipe sections, a conduit extending radially outward from said one of said pipe sections, bucket means mounted on said wheel and adapted to receive fluid from said conduit to thereby propel said wheel by the force of gravity acting on said fluid, a control valve in said conduit, and means connecting said control valve to the adjoining pipe section over said flexible coupling so that said control valve is responsive to the angular relation of said pipe sections to control the flow of fluid to said bucket means and thereby control the speed of said wheel.

10. The system as defined in claim 9, wherein said wheel is rotatably mounted on said one of said pipe sections, said pipe section constituting an axle therefor, and wherein means are provided for preventing rotation of said pipe sections as the wheel advances so that said conduit is maintained in a selected position for delivering operating fluid to the bucket means mounted on said wheel.

References Cited in the file of this patent

UNITED STATES PATENTS

| | | |
|---|---|---|
| 2,604,359 | Zybach | July 22, 1952 |
| 2,628,863 | Maggart | Feb. 17, 1953 |
| 2,726,895 | Behlen | Dec. 13, 1955 |
| 2,730,403 | Huntley | Jan. 10, 1956 |